United States Patent
Zou (10) Patent No.: US 10,120,494 B2
(45) Date of Patent: Nov. 6, 2018

(54) TOUCH PANEL, TOUCH POINT DETECTION METHOD, AND DISPLAY DEVICE

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 49 days.

(21) Appl. No.: 15/258,507

(22) Filed: Sep. 7, 2016

(65) Prior Publication Data

US 2017/0192588 A1 Jul. 6, 2017

(30) Foreign Application Priority Data

Jan. 4, 2016 (CN) .......................... 2016 1 0004053

(51) Int. Cl.
  *G06F 3/041* (2006.01)
  *G06F 3/044* (2006.01)

(52) U.S. Cl.
  CPC .......... *G06F 3/0416* (2013.01); *G06F 3/0412* (2013.01); *G06F 3/044* (2013.01); *G06F 2203/04103* (2013.01)

(58) Field of Classification Search
  CPC ........ G06F 3/044; G06F 3/041; G06F 3/0412; G06F 3/0416
  See application file for complete search history.

(56) References Cited

U.S. PATENT DOCUMENTS

| | | | | |
|---|---|---|---|---|
| 2011/0279409 A1* | 11/2011 | Salaverry | ............. | G06F 3/0416 345/174 |
| 2012/0262419 A1* | 10/2012 | Hershman | ............... | G06F 3/044 345/174 |
| 2012/0306802 A1* | 12/2012 | McCracken | .......... | G06F 3/0416 345/174 |
| 2013/0257799 A1* | 10/2013 | Lamont | .................... | G06F 3/044 345/174 |
| 2015/0177298 A1* | 6/2015 | Sugiura | .................... | G06F 3/044 324/658 |
| 2016/0004343 A1* | 1/2016 | Gourevitch | ............ | G06F 3/044 345/174 |
| 2016/0041654 A1* | 2/2016 | Bulea | ....................... | G06F 3/044 345/174 |
| 2016/0224156 A1* | 8/2016 | Ahn | ....................... | G06F 3/0412 |

* cited by examiner

*Primary Examiner* — Benjamin C Lee
*Assistant Examiner* — Dong Hui Liang
(74) *Attorney, Agent, or Firm* — Brooks Kushman P.C.

(57) ABSTRACT

The present disclosure relates to a touch panel, a touch point detection method and a display device. The touch panel includes a base substrate, and touch electrodes arranged on the base substrate. The touch electrodes include first electrodes, second electrodes and third electrodes, and electrode lines are shared by a plurality of corresponding touch electrodes.

14 Claims, 7 Drawing Sheets

TOUCH PANEL, TOUCH POINT DETECTION METHOD, AND DISPLAY DEVICE

CROSS-REFERENCE TO RELATED APPLICATIONS

This application claims priority to Chinese application No. 201610004053.X, filed Jan. 4, 2016, which is hereby incorporated by reference in its entirety.

TECHNICAL FIELD

The present disclosure relates to the field of touch technology, in particular to a touch panel, a touch point detection method and a display device.

BACKGROUND

Along with the development of the touch technology, display devices having a touch function have been widely used in the production and life. This kind of display device may include a touch panel, a sensor, a controller and a display panel.

In the related art, each touch electrode on the touch panel needs to be connected to an electrode line, so each touch electrode is provided with a corresponding welding point. Due to the large number of the welding points, the difficulty for a welding process may increase, and thereby the yield of the touch panel may decrease, the touch panel may be provided with a complex structure, and the production cost thereof may increase. In addition, due to the too many electrode lines, the number of blind regions may increase, and the touch performance may be adversely affected.

SUMMARY

An object of the present disclosure is to provide a touch panel, a touch point detection method and a display device, so as to simplify the structure of the touch panel and reduce the production cost.

In one aspect, the present disclosure provides in some embodiments a touch panel, including a base substrate, and an upper touch region and a lower touch region arranged on the base substrate. M*n touch sub-regions are arranged in an array form at each of the upper touch region and the lower touch region, where m represents the number of rows of the touch sub-regions, and n represents the number of columns of the touch sub-regions. A first electrode is arranged at each touch sub-region, and among the first electrodes in an identical column, an identical electrode line is shared by each first electrode at the upper touch region and a corresponding first electrode at the lower touch region. A plurality of second electrodes is arranged at each of the upper touch region and the lower touch region, and each second electrode corresponds to m touch sub-regions in a column where the second electrode is located and each second electrode is connected to an electrode line. Each second electrode is an annular electrode surrounding m first electrodes at m touch sub-regions in a column where the second electrode is located, or a strip electrode located at an identical side relative to the m first electrodes at m touch sub-regions in the column where the second electrode is located. A plurality of third electrodes is arranged at each of the upper touch region and the lower touch region, and each third electrode corresponds to one of the touch sub-regions. The second electrodes and the third electrodes are arranged alternately on the base substrate in a row direction. The second electrodes at the upper touch region and the corresponding third electrodes at the lower touch region are arranged in an identical column, and the third electrodes at the upper touch region and the corresponding second electrodes at the lower touch region are arranged in an identical column. An identical electrode line is shared by each third electrode and at least one third electrode in an identical row. Each third electrode is an annular electrode surrounding the first electrode at a touch sub-region corresponding to the third electrode, or a strip electrode located at an identical side relative to the first electrode at a touch sub-region corresponding to the third electrode.

Optionally, in the case that each second electrode and each third electrode on the base substrate are both strip electrodes, the second electrodes and the third electrodes at two adjacent touch sub-regions in the row direction are arranged at an identical side relative to the corresponding first electrodes at the two adjacent touch sub-regions.

Optionally, the first electrodes, the second electrodes and the third electrodes are arranged at an identical layer on the base substrate.

Optionally, the first electrodes, the second electrodes and the third electrodes are arranged at at least two layers on the base substrate.

Optionally, an identical electrode line is shared by the third electrodes at the touch sub-regions in each row.

Optionally, the first electrodes in each column on the base substrate are connected to the corresponding electrode lines in an identical manner.

Optionally, an identical electrode line is shared by each first electrode at the upper touch region in an $x^{th}$ row and a corresponding first electrode at the lower touch region in an $x^{th}$ row and in an identical column, where x is greater than or equal to 1 and smaller than or equal to m.

In another aspect, the present disclosure provides in some embodiments a touch point detection method for use in the above-mentioned touch panel, including steps of: in the case that the touch panel is being touched by a user, determining whether or not a detection value of each electrode on the touch panel is changed; in the case that the detection values of a first electrode and a third electrode at a third touch sub-region and a second electrode at a touch sub-region adjacent to the third touch sub-region are changed, determining the third touch sub-region as a touch point, the third touch sub-region being a touch sub-region where the third electrode is located; and/or in the case that the detection values of a first electrode and a second electrode at a second touch sub-region and a third electrode at a touch sub-region adjacent to the second touch sub-region are changed, determining the second touch sub-region as the touch point, the second touch sub-region being a touch sub-region where the second electrode is located.

In yet another aspect, the present disclosure provides in some embodiments a display device including the above-mentioned touch panel.

According to the embodiments of the present disclosure, the first electrodes, the second electrodes and the third electrodes are arranged on the base substrate, and some of these electrodes may share an identical electrode line. As a result, as compared with the related art, it is able to reduce the number of the electrode lines and the welding points, simplify the welding process, improve the yield of the touch panel, simplify the structure of the touch panel, reduce the production cost, reduce the number of the blind regions, and improve the touch performance.

It should be appreciated that, the above-mentioned general description and the following details are for illustrative and explanatory purposes only, but shall not be used to limit the scope of the present disclosure.

DESCRIPTION OF THE DRAWINGS

The drawings herein are incorporated into, and constitute a part of, the specification, so as to show the embodiments of the present disclosure and explain the principles of the present disclosure in conjunction with the specification.

FIGS. 1-1 to 1-4 are schematic views showing a touch panel according to one embodiment of the present disclosure;

FIG. 3-1 is a flow chart of a touch point detection method according to one embodiment of the present disclosure;

FIG. 3-2 is a schematic view showing the touch panel used in the method in FIG. 3-1;

FIG. 4-1 is another flow chart of the touch point detection method according to one embodiment of the present disclosure;

FIG. 4-2 is a schematic view showing of the touch panel used in the method in FIG. 4-1;

The above drawings show the embodiments of the present disclosure, which will be described in more details hereinafter. The drawings and the description thereof shall not be used to limit the scope of the present disclosure in any way, but are used to illustrate the concepts of the present disclosure with reference to the specific embodiments.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Unless otherwise defined, an identical numeral represents an identical or similar element. The following embodiments are merely parts of the embodiments of the present disclosure, i.e., they merely relate to some examples of the devices and methods described in the appended claims.

Usually, a conventional touch panel includes a plurality of touch electrodes arranged in an array form and a plurality of electrode lines, and each touch electrode corresponds to one of the electrode lines. Each electrode line is connected to a corresponding touch electrode and a sensor, and the sensor is connected to a controller. During the operation, the sensor may acquire a detection value of each touch electrode. In the case that the touch panel is being touched by a user, the detection value of the touch electrode at a touch position may be changed, and after this change in the detection value is acquired by the controller through the sensor, a position where the touch electrode is located may be determined as the touch position. Because each touch electrode needs to be connected to an electrode line, each touch electrode is provided with a corresponding welding point. Due to the large number of the welding points, the difficulty for a welding process may increase, and thereby the yield of the touch panel may decrease, the touch panel may be provided with a complex structure, and the production cost thereof may increase. In addition, due to the too many electrode lines, the number of blind regions may increase, and the touch performance may be adversely affected.

Figure 11:
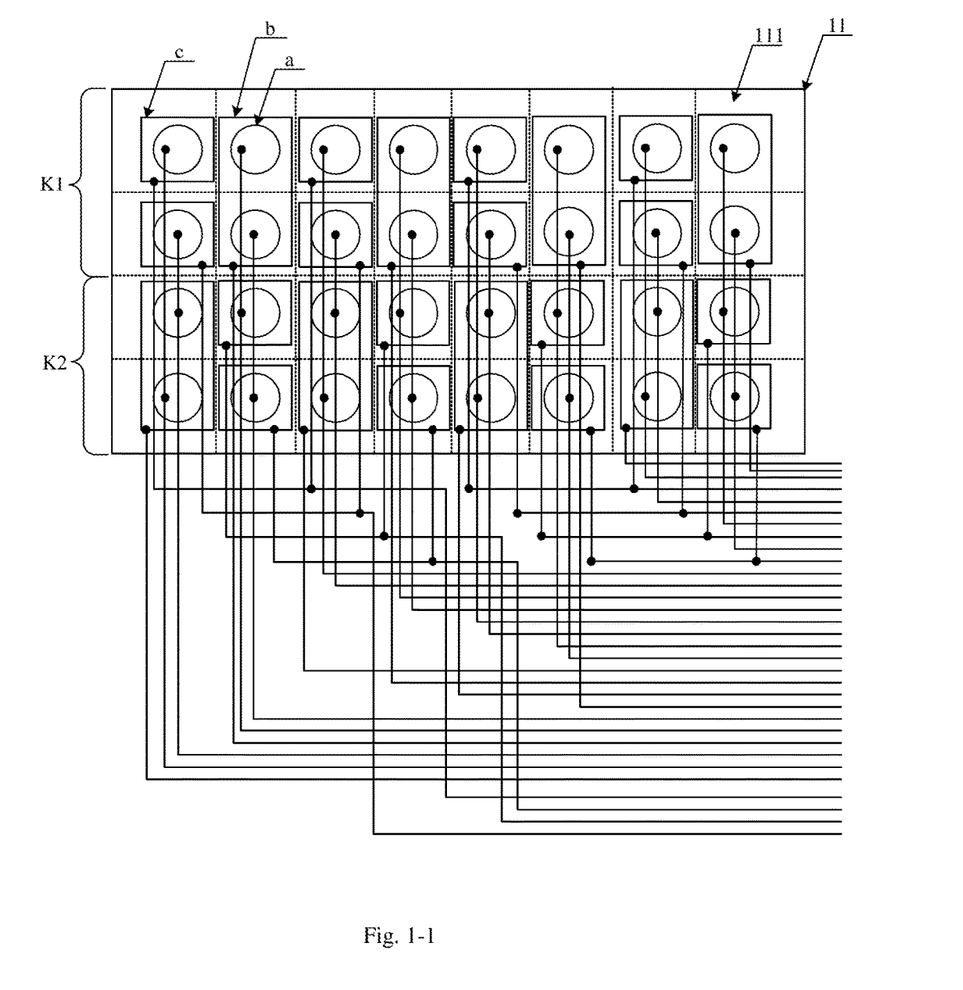

As shown in FIG. 1-1, which is a schematic view showing a touch panel according to one embodiment of the present disclosure, the touch panel may include a base substrate 11, and an upper touch region K1 and a lower touch region K2 arranged on the base substrate. M*n touch sub-regions 111 are arranged in an array form at each of the upper touch region K1 and the lower touch region K2, where m represents the number of rows of the touch sub-regions 111, and n represents the number of columns of the touch sub-regions 111. A first electrode a is arranged at each touch sub-region 111, and among the first electrodes a in an identical column, an identical electrode line is shared by each first electrode a at the upper touch region K1 and a corresponding first electrode a at the lower touch region K2. In FIG. 1, m is 2 and n is 8. However, m and n may each be any other positive integer, which is not particularly defined herein.

A plurality of second electrodes b is arranged at each of the upper touch region K1 and the lower touch region K2, and each second electrode b corresponds to m touch sub-regions 111 in a column where the second electrode b is located and each second electrode is connected to an electrode line. Each second electrode b is an annular electrode surrounding m first electrodes a at m touch sub-regions 111 in a column where the second electrode b is located, or a strip electrode located at an identical side relative to the m first electrodes a at m corresponding touch sub-regions 111 in the column where the second electrode b is located.

Figure 12:
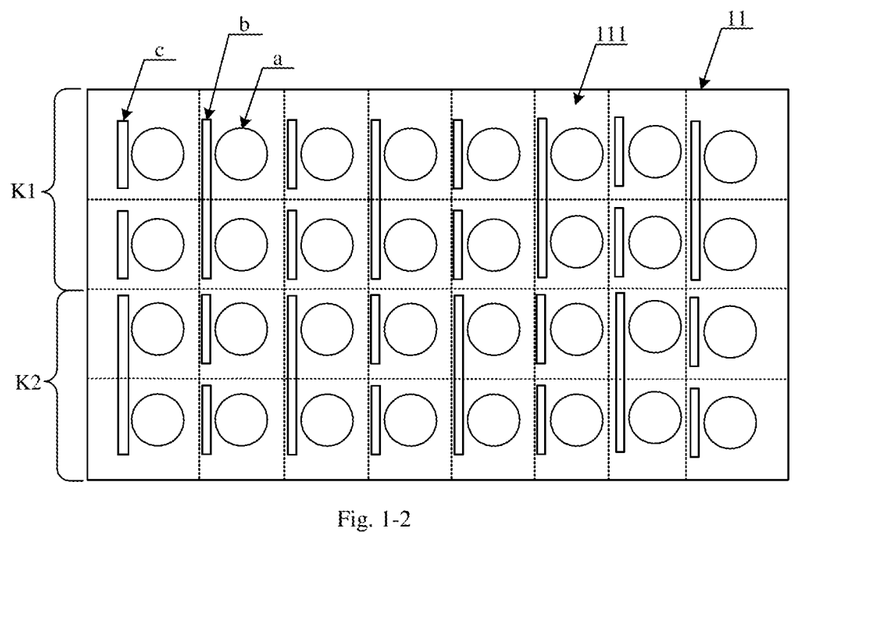
Figure 13:
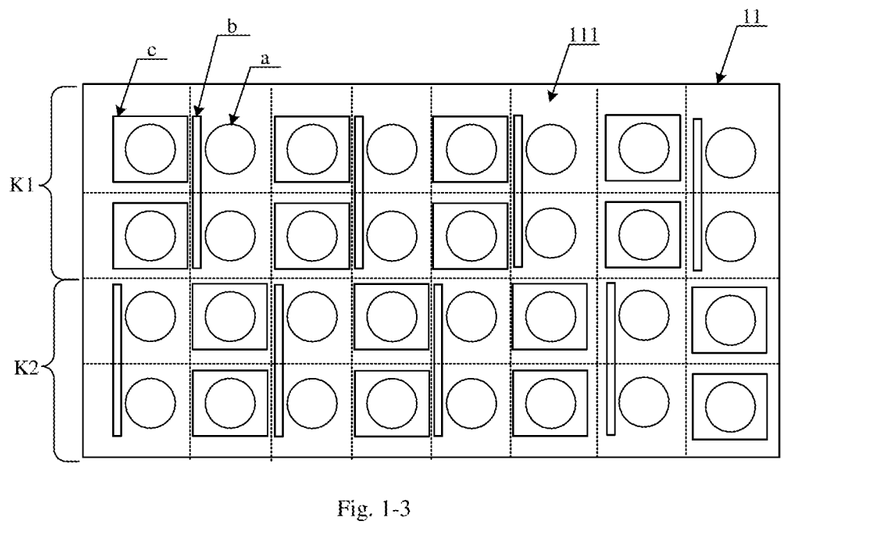
Figure 14:
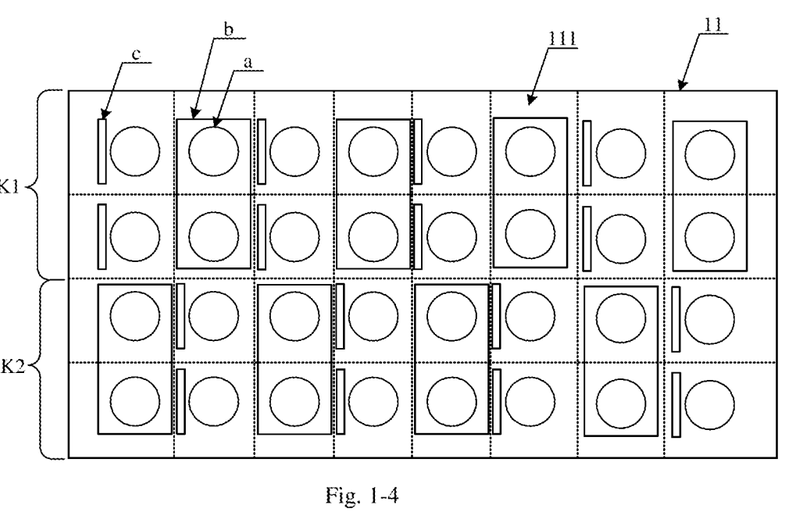

A plurality of third electrodes c is arranged at each of the upper touch region K1 and the lower touch region K2, and each third electrode c corresponds to one of the touch sub-regions 111. The second electrodes b and the third electrodes c are arranged alternately on the base substrate 11 in a row direction. The second electrodes b at the upper touch region K1 and the corresponding third electrodes c at the lower touch region K2 are arranged in an identical column, and the third electrodes c at the upper touch region K1 and the corresponding second electrodes b at the lower touch region K2 are arranged in an identical column. An identical electrode line is shared by each third electrode c and at least one third electrode c in an identical row. Each third electrode c is an annular electrode surrounding the first electrode a at the touch sub-region 111 corresponding to the third electrode c, or a strip electrode located at an identical side relative to the first electrode a at the touch sub-region 111 corresponding to the third electrode c. In the case that each second electrode b and each third electrode c on the base substrate 11 are both strip electrodes, the second electrodes b and the third electrodes c at two adjacent touch sub-regions 111 in the row direction are arranged at an identical side relative to the corresponding first electrodes a at the two adjacent touch sub-regions 111. As shown in FIG. 1-2, the second electrodes b and the third electrodes c are arranged at a left side of the corresponding first electrodes a.

It should be appreciated that, the present disclosure merely shows in the embodiments and the drawings structures of parts of the second electrodes and the third electrodes as well as the connection relationships therebetween, and the other second electrodes and third electrodes may have the identical structures and connection relationships.

FIG. 1-1 shows the situation where the second electrodes b and the third electrodes c are all annular electrodes. FIG. 1-2 shows the situation where the second electrodes b and the third electrodes c are all strip electrodes. FIG. 1-3 shows the situation where the second electrodes b are strip electrodes and the third electrodes c are annular electrodes. FIG. 1-4 shows the situation where the second electrodes b are annular electrodes and the third electrodes c are strip electrodes. The connection relationships of the electrode lines and the meanings of the reference signs in FIGS. 1-2, 1-3 and 1-4 may refer to those in FIG. 1-1. In addition, in FIGS. 1-1, 1-2, 1-3 and 1-4, the first electrodes a are all circular electrodes. Of course, the first electrode a may be of any other shapes, e.g., a rectangular, diamond or polygonal shape, which is not particularly defined herein.

According to the touch panel in the embodiments of the present disclosure, the first electrodes, the second electrodes and the third electrodes are arranged on the base substrate, and some of these electrodes may share an identical electrode line. As a result, as compared with the related art, it is able to reduce the number of the electrode lines and the welding points, simplify the welding process, improve the yield of the touch panel, simplify the structure of the touch panel, reduce the production cost, reduce the number of the blind regions, and improve the touch performance.

Figure 2:
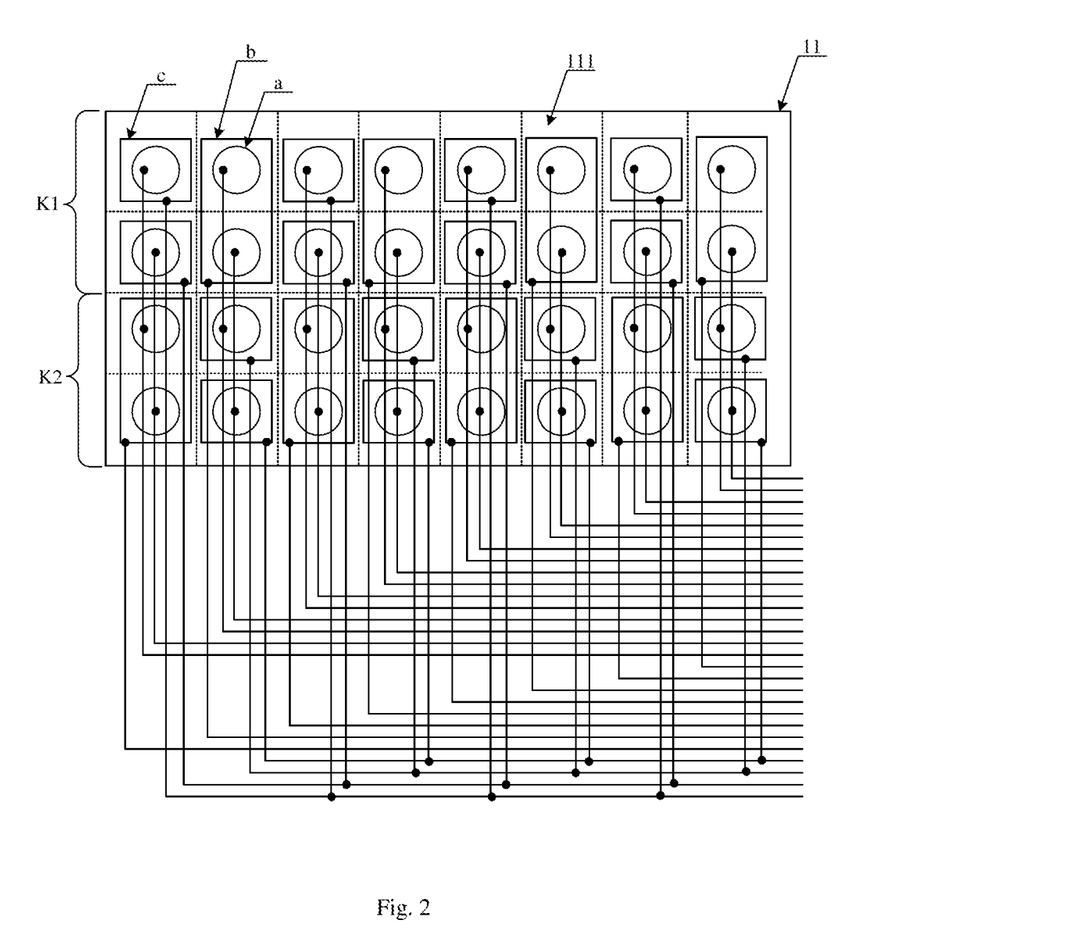
FIG. 2 is another schematic view showing the touch panel according to one embodiment of the present disclosure.

Referring to FIG. 2, which is another schematic view showing the touch panel according to one embodiment of the present disclosure, the structure of the touch panel is adjusted on the basis of that in FIG. 1, so as to improve its performance.

Optionally, an identical electrode line is shared by the third electrodes c at the touch sub-regions 111 in each row, so as to further reduce the number of the electrode lines.

Optionally, the first electrodes a in each column on the base substrate 11 are connected to the corresponding electrode lines in an identical manner, so as to facilitate the wiring, and meanwhile facilitate the identification of the touch sub-region touched by the user and thereby reduce the probability of erroneous judgment.

Optionally, an identical electrode line is shared by each first electrode a at the upper touch region K1 in an $x^{th}$ row and a corresponding first electrode a at the lower touch region K2 in an $x^{th}$ row and in an identical column, where x is greater than or equal to 1 and smaller than or equal to m. For example, the first electrode at the touch sub-region in a first column and a first row at the upper touch region K1 shares the same electrode line with the first electrode at the touch sub-region in a first column and a first row at the lower touch region K2.

Optionally, the first electrodes a, the second electrodes b and the third electrodes c are arranged at an identical layer on the base substrate 11. At this time, it is able to form the first electrodes a, the second electrodes b and the third electrodes c through a single patterning process. As compared with the related art, it is able to reduce the number of the electrode lines without increasing the number of the patterning processes.

Optionally, the first electrodes a, the second electrodes b and the third electrodes c are arranged at at least two layers on the base substrate 11, i.e., the first electrodes a, the second electrodes b and the third electrodes c may be arranged at different layers. For example, the first electrodes a, the second electrodes b and the third electrodes c may arranged at three different layers, and the order of the three layers may not be particularly defined. In addition, two kinds of the first electrodes a, the second electrodes b and the third electrodes c may be arranged at an identical layer, and the remaining kind of them may be arranged at another layer.

It should be appreciated that, in the related art, each electrode line is provided for one touch region, so 2m*n electrode lines need to be provided for the 2m*n touch regions in FIG. 2. In the embodiments of the present disclosure, merely m*n+2m+n electrode lines may be provided, so the number of the electrode lines may be reduced by m*n−2m−n. In the case that m and n are each greater than 3, the number of the electrode lines used in the embodiments of the present disclosure is smaller than the number of the electrode lines used in the related art. Usually, the number of the rows and columns of touch sub-regions are far greater than 3, so it is able to reduce the number of the electrode lines.

It should be further appreciated that, in the case that the first electrodes, the second electrodes and the third electrodes are arranged at an identical layer, it is able to form these electrodes through a single patterning process, thereby to simplify the manufacture procedure and reduce the manufacture cost.

It should be further appreciated that, the third electrodes at the touch sub-regions in each row share an identical electrode line, so it is able to reduce the number of the electrode lines.

According to the touch panel in the embodiments of the present disclosure, the first electrodes, the second electrodes and the third electrodes are arranged on the base substrate, and some of these electrodes may share an identical electrode line. As a result, as compared with the related art, it is able to reduce the number of the electrode lines and the welding points, simplify the welding process, improve the yield of the touch panel, simplify the structure of the touch panel, reduce the production cost, reduce the number of the blind regions, and improve the touch performance.

The present disclosure further provides in some embodiments a touch point detection method. A touch sub-region where the second electrode is located may be called as a second touch sub-region, and a touch sub-region where the third electrode is located may be called as a third touch sub-region. In the case of detecting a touch point on the touch panel, there may exist the following three circumstances.

Figure 31:
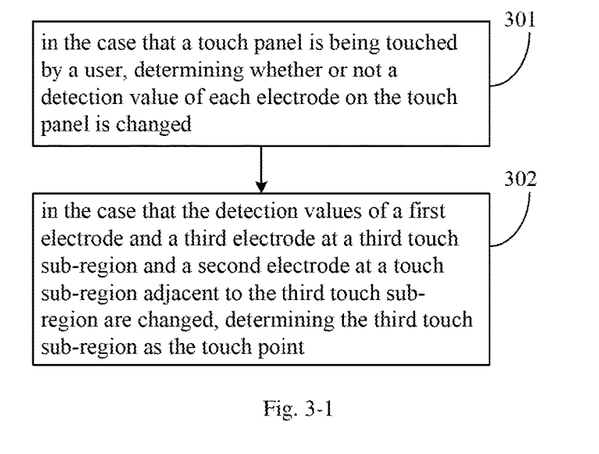

Under a first circumstance where a touch point is located at the third touch sub-region, as shown in FIG. 3-1, the touch point detection method for use in the touch panel in FIG. 2 may include the following steps.

Step 301: in the case that the touch panel is being touched by a user, determining whether or not a detection value of each electrode on the touch panel is changed.

During the operation of the touch panel, the controller may determine the change in the detection value of each electrode on the touch panel in the case that the touch panel is being touched by the user. To be specific, the touch electrode on the touch panel may be scanned using a known method in the art to acquire the detection value of each touch electrode.

Step 302: in the case that the detection values of the first electrode and the third electrode at the third touch sub-region and the second electrode at the touch sub-region adjacent to the third touch sub-region are changed, determining the third touch sub-region as the touch point.

After the controller acquires the change in the detection value of each touch electrode, it may further perform judgment on the third touch sub-regions where the detection values of the electrodes are changed, and in the case that the detection values of the first electrode and the third electrode at the third touch sub-region are changed and the detection value of the second electrode at the touch sub-region adjacent to the third touch sub-region is changed, determine the third touch sub-region as the touch point.

Figure 32:
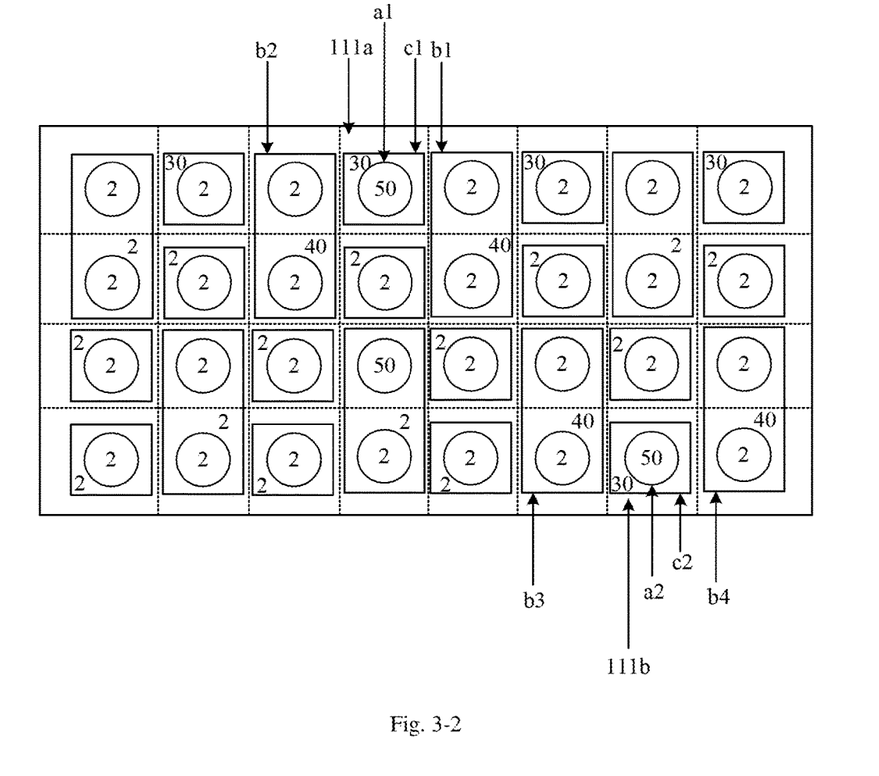

For example, an initial detection value of the first electrode is 2 and a changed detection value is 50; an initial detection value of the second electrode is 2 and a changed detection value is 40; and an initial detection value of the third electrode is 2 and a changed detection value is 30. In the case that the touch panel is being touched by the user, FIG. 3-2 shows the change in the detection values of the touch electrodes on the touch panel. As shown in FIG. 3-2, detection values of a first electrode a1 and a third electrode c1 at a third touch sub-region 111a are changed, and detection values of second electrodes b1 and b2 at touch sub-regions adjacent to the third touch sub-region 111a are changed too (or in the case that the second electrode is a strip electrode, one second electrode at the touch sub-region adjacent to the third touch sub-region is changed). At this time, the third touch sub-region 111a may be determined as the touch point. In the case that detection values of a first electrode a2 and a third electrode c2 at a third touch sub-region 111b are changed and detection values of second electrodes b3 and b4 at touch sub-regions adjacent to the third touch sub-region 111b are changed too, the third touch sub-region 111b may also be determined as the touch point.

It should be appreciated that, the above-mentioned steps may be executed by the controller.

According to the touch point detection method in the embodiments of the present disclosure, whether or not the third touch sub-region is the touch point may be determined by determining whether or not the detection values of the first electrode and the third electrode at the third touch sub-region are changed and the detection value of the second electrode at the touch sub-region adjacent to the third touch sub-region is changed. As a result, it is able to detect the touch point merely through fewer electrode lines.

Figure 41:
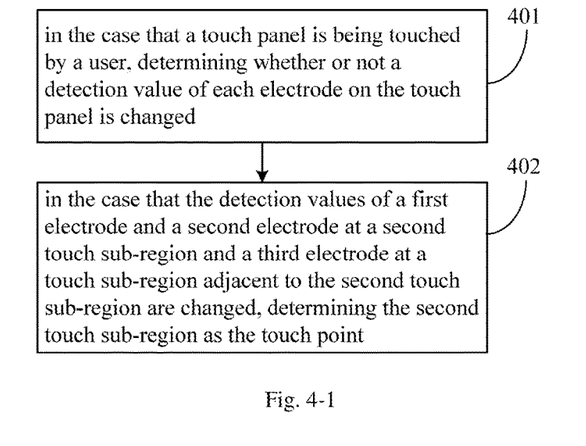

Under a second circumstance where the touch point is located at the second touch sub-region. As shown in FIG. 4-1, the touch point detection method for use in the touch panel in FIG. 2 may include the following steps.

Step 401: in the case that the touch panel is being touched by a user, determining whether or not a detection value of each electrode on the touch panel is changed.

During the operation of the touch panel, the controller may determine the change in the detection value of each electrode on the touch panel in the case that the touch panel is being touched by the user. To be specific, the touch electrode on the touch panel may be scanned using a known method in the art to acquire the detection value of each touch electrode.

Step 402: in the case that the detection values of the first electrode and the second electrode at the second touch sub-region and the third electrode at a touch sub-region adjacent to the second touch sub-region are changed, determining the second touch sub-region as the touch point.

After the controller acquires the change in the detection value of each touch electrode, it may further perform judgment on the second touch sub-regions where the detection values of the electrodes are changed, and in the case that the detection values of the first electrode and the second electrode at the second touch sub-region are changed and the detection value of the third electrode at the touch sub-region adjacent to the second touch sub-region is changed, determine the second touch sub-region as the touch point.

Figure 42:
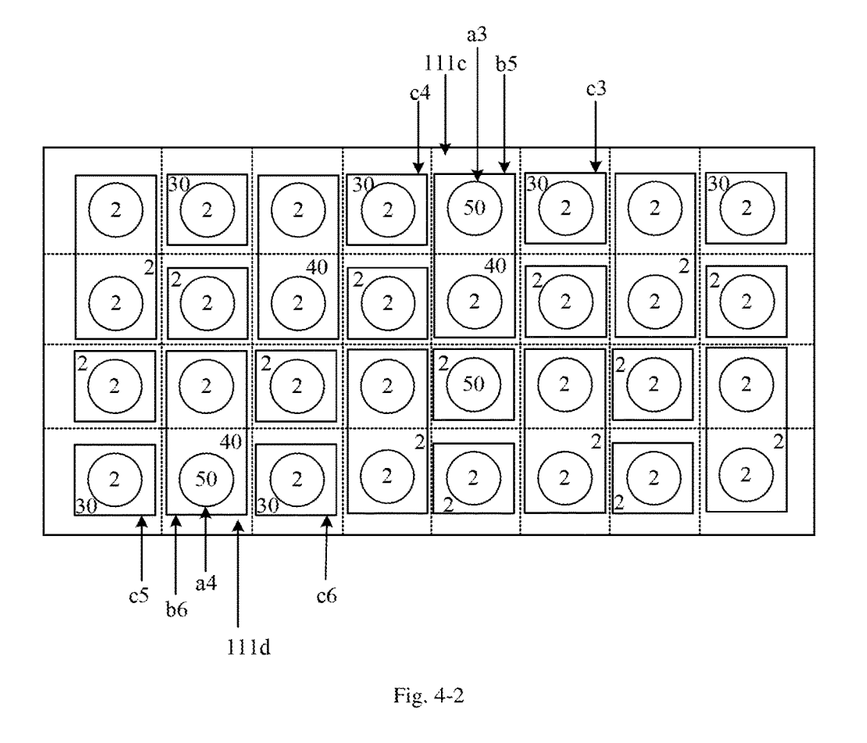

For example, an initial detection value of the first electrode is 2 and a changed detection value is 50; an initial detection value of the second electrode is 2 and a changed detection value is 40; and an initial detection value of the third electrode is 2 and a changed detection value is 30. In the case that the touch panel is being touched by the user, FIG. 4-2 shows the change in the detection values of the touch electrodes on the touch panel. As shown in FIG. 4-2, detection values of a first electrode a3 and a second electrode b5 at a second touch sub-region 111c are changed, and detection values of third electrodes c3 and c4 at touch sub-regions adjacent to the second touch sub-region 111c are changed too (or in the case that the third electrode is a strip electrode, one second electrode at the touch sub-region adjacent to the second touch sub-region is changed). At this time, the second touch sub-region 111c may be determined as the touch point. In the case that detection values of a first electrode a4 and a second electrode b6 at a second touch sub-region 111d are changed and detection values of third electrodes c5 and c6 at touch sub-regions adjacent to the second touch sub-region 111d are changed too, the second touch sub-region 111d may also be determined as the touch point.

It should be appreciated that, the above-mentioned steps may be executed by the controller.

According to the touch point detection method in the embodiments of the present disclosure, whether or not the second touch sub-region is the touch point may be determined by determining whether or not the detection values of the first electrode and the second electrode at the second touch sub-region are changed and the detection value of the third electrode at the touch sub-region adjacent to the second touch sub-region is changed. As a result, it is able to detect the touch point merely through fewer electrode lines.

Figure 5:
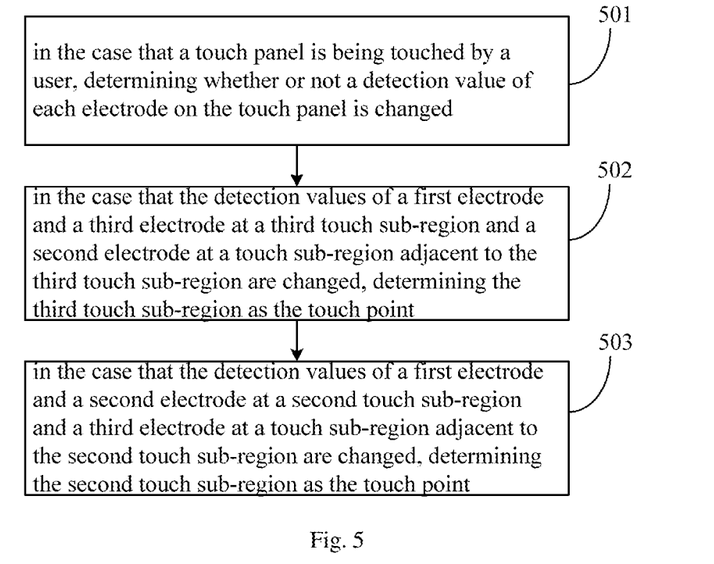
FIG. 5 is yet another flow chart of the touch point detection method according to one embodiment of the present disclosure.

Under a third circumstance where the touch points are located at the second touch sub-region and the third touch sub-region. As shown in FIG. 5, the touch point detection method for use in the touch panel in FIG. 2 may include the following steps.

Step 501: in the case that the touch panel is being touched by a user, determining whether or not a detection value of each electrode on the touch panel is changed.

During the operation of the touch panel, the controller may determine the change in the detection value of each electrode on the touch panel in the case that the touch panel is being touched by the user. To be specific, the touch electrode on the touch panel may be scanned using a known method in the art to acquire the detection value of each touch electrode.

Step 502: in the case that the detection values of the first electrode and the third electrode at the third touch sub-region and the second electrode at a touch sub-region adjacent to the third touch sub-region are changed, determining the third touch sub-region as the touch point. This step may refer to Step 302 in FIG. 3-1.

Step 503: in the case that the detection values of the first electrode and the second electrode at the second touch sub-region and the third electrode at a touch sub-region adjacent to the second touch sub-region are changed, determining the second touch sub-region as the touch point. This step may refer to Step 402 in FIG. 4-1.

It should be appreciated that, the order of Steps 503 and 502 may not be particularly defined herein, i.e., Step 503 may also be performed prior to Step 502, or Steps 503 and 502 may be performed simultaneously.

It should be appreciated that, the above-mentioned steps may be executed by the controller.

According to the touch point detection method in the embodiments of the present disclosure, whether or not the second touch sub-region is the touch point may be determined by determining whether or not the detection values of the first electrode and the second electrode at the second touch sub-region are changed and the detection value of the third electrode at the touch sub-region adjacent to the second touch sub-region is changed, and whether or not the third touch sub-region is the touch point may be determined by determining whether or not the detection values of the first electrode and the third electrode at the third touch sub-region are changed and the detection value of the second electrode at the touch sub-region adjacent to the third touch sub-region is changed. As a result, it is able to detect the touch point merely through fewer electrode lines.

It should be appreciated that, the larger the touch region, the larger the change in the detection value. In the case that an erroneous judgment occurs due to a large number of touch points on the touch panel, an actual touch position may be determined in accordance with a size of the detection value of the touch electrode.

Figure 6:
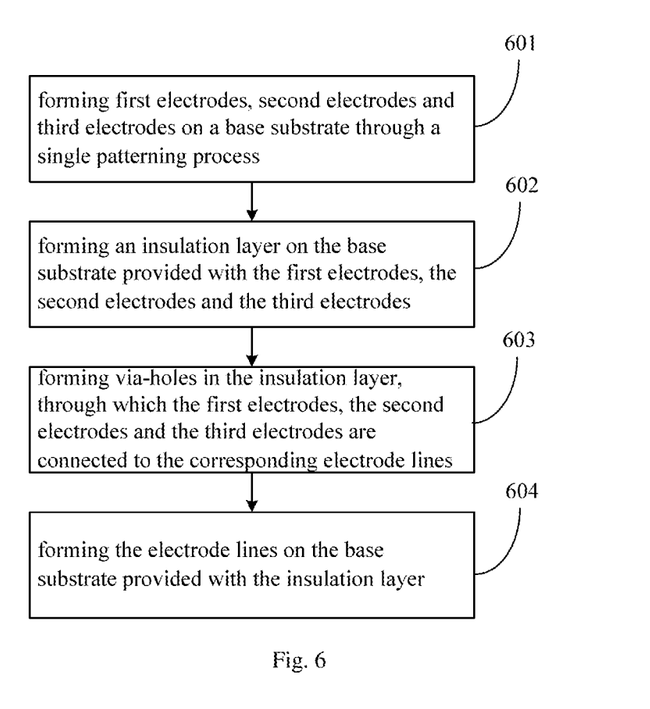
FIG. 6 is a flow chart of a method for manufacturing the touch panel according to one embodiment of the present disclosure.

FIG. 6 is a flow chart of a method for manufacturing the touch panel in FIG. 2 where the first electrodes, the second electrodes and the third electrodes are arranged at an identical layer. The method includes the following steps.

Step 601: forming the first electrodes, the second electrodes and the third electrodes on the base substrate through a single patterning process.

To be specific, during the manufacture, the first electrodes, the second electrodes and the third electrodes in FIG. 2 may be formed on the base substrate through a single patterning process. It should be appreciated that, the electrode line connected to the third electrodes in an identical row may be formed simultaneously through the patterning process.

Step 602: forming an insulation layer on the base substrate provided with the first electrodes, the second electrodes and the third electrodes. To be specific, after the formation of the first electrodes, the second electrodes and the third electrodes, the insulation layer may be formed on the base substrate.

Step 603: forming via-holes in the insulation layer, through which the first electrodes, the second electrodes and the third electrodes are connected to the corresponding electrode lines.

Step 604: forming the electrode lines on the base substrate provided with the insulation layer. After the formation via-holes, the electrode lines may be formed on the base substrate, and through these via-holes, the touch electrodes under the insulation layer may be connected to the corresponding electrode lines, as shown in FIG. 2.

In addition, the touch panel in the embodiments of the present disclosure may be a single-layered self-capacitive touch panel.

According to the method for manufacturing the touch panel in the embodiments of the present disclosure, it is able to form the first electrodes, the second electrodes and the third electrodes through a single patterning process, so as to reduce the number of the electrode lines without any additional patterning process.

The present disclosure further provides in some embodiments a display device including the touch panel in FIGS. 1-1 to 1-4, or in FIG. 2.

The above are merely the preferred embodiments of the present disclosure. Obviously, a person skilled in the art may make further modifications and improvements without departing from the spirit of the present disclosure, and these modifications and improvements shall also fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A touch panel, comprising a base substrate, wherein
a first touch region and a second touch region are arranged on the base substrate, m*n touch sub-regions are arranged in an array form at each of the first touch region and the second touch region, where m represents the number of rows of the touch sub-regions, and n represents the number of columns of the touch sub-regions;

2*m*n first electrodes are arranged on the base substrate, each touch sub-region is provided with one first electrode, and among the first electrodes in an identical column, an identical electrode line is shared by each first electrode at the first touch region and a corresponding first electrode at the second touch region;

n/2 second electrodes are arranged at each of the first touch region and the second touch region, each second electrode corresponds to m touch sub-regions in a column where the second electrode is located, each second electrode is connected to an electrode line, and each second electrode is an annular electrode surrounding m first electrodes at m touch sub-regions in the column where the second electrode is located;

m*n/2 third electrodes are arranged at each of the first touch region and the second touch region, and each third electrode corresponds to one of the touch sub-regions, an identical electrode line is shared by each third electrode and at least one third electrode in an identical row, and each third electrode is an annular electrode surrounding the first electrode at the one of the touch sub-regions corresponding to the third electrode; and the second electrodes and the third electrodes are arranged alternately on the base substrate in a row direction, the second electrodes at the first touch region and the corresponding third electrodes at the second touch region are arranged in an identical column, and the third electrodes at the first touch region and the corresponding second electrodes at the second touch region are arranged in an identical column.

2. A display device, comprising the touch panel according to claim 1.

3. The display device according to claim 2, wherein the first electrodes in each column on the base substrate are connected to the corresponding electrode lines in an identical manner.

4. The display device according to claim 3, wherein an identical electrode line is shared by each first electrode at the first touch region in an $x^{th}$ row and a corresponding first electrode at the second touch region in an $x^{th}$ row and in an identical column, where x is an integer greater than or equal to 1 and smaller than or equal to m.

5. The display device according to claim 2, wherein the first electrodes, the second electrodes and the third electrodes are arranged at an identical layer on the base substrate.

6. The display device according to claim 2, wherein the first electrodes, the second electrodes and the third electrodes are arranged at at least two layers on the base substrate.

7. The display device according to claim 2, wherein an identical electrode line is shared by the third electrodes at the touch sub-regions in each row.

8. The touch panel according to claim 1, wherein the first electrodes in each column on the base substrate are connected to the corresponding electrode lines in an identical manner.

9. The touch panel according to claim 8, wherein an identical electrode line is shared by each first electrode at the first touch region in an $x^{th}$ row and a corresponding first electrode at the second touch region in an $x^{th}$ row and in an identical column, where x is an integer greater than or equal to 1 and smaller than or equal to m.

10. The touch panel according to claim 1, wherein the first electrodes, the second electrodes and the third electrodes are arranged at an identical layer on the base substrate.

11. The touch panel according to claim 1, wherein the first electrodes, the second electrodes and the third electrodes are arranged at at least two layers on the base substrate.

12. The touch panel according to claim 1, wherein an identical electrode line is shared by the third electrodes at the touch sub-regions in each row.

13. A touch point detection method for use in the touch panel according to claim 1, comprising steps of:
  in the case that the touch panel is being touched by a user, determining whether or not a detection value of each electrode on the touch panel is changed; and
  in the case that the detection values of a first electrode and a third electrode at a third touch sub-region and a second electrode at a touch sub-region adjacent to the third touch sub-region are changed, determining the third touch sub-region as a touch point, the third touch sub-region being a touch sub-region where the third electrode is located; or
  in the case that the detection values of a first electrode and a second electrode at a second touch sub-region and a third electrode at a touch sub-region adjacent to the second touch sub-region are changed, determining the second touch sub-region as the touch point, the second touch sub-region being a touch sub-region where the second electrode is located.

14. A touch point detection method for use in the touch panel according to claim 1, comprising steps of:
  in the case that the touch panel is being touched by a user, determining whether or not a detection value of each electrode on the touch panel is changed;
  in the case that the detection values of a first electrode and a third electrode at a third touch sub-region and a second electrode at a touch sub-region adjacent to the third touch sub-region are changed, determining the third touch sub-region as a touch point, the third touch sub-region being a touch sub-region where the third electrode is located; and
  in the case that the detection values of a first electrode and a second electrode at a second touch sub-region and a third electrode at a touch sub-region adjacent to the second touch sub-region are changed, determining the second touch sub-region as the touch point, the second touch sub-region being a touch sub-region where the second electrode is located.

* * * * *